(12) United States Patent
DeVincentis et al.

(10) Patent No.: US 7,068,419 B2
(45) Date of Patent: Jun. 27, 2006

(54) OVERMOLDED, ULTRA-SMALL FORM FACTOR OPTICAL REPEATER

(75) Inventors: David S. DeVincentis, Flanders, NJ (US); Mark K. Young, Monmouth Junction, NJ (US); Savino S. Camporeale, Cranbury, NJ (US)

(73) Assignee: Red Sky Subsea Ltd., Essex (GB)

( * ) Notice: Subject to any disclaimer, the term of this patent is extended or adjusted under 35 U.S.C. 154(b) by 48 days.

(21) Appl. No.: 10/800,425

(22) Filed: Mar. 12, 2004

(65) Prior Publication Data

US 2005/0201709 A1    Sep. 15, 2005

(51) Int. Cl.
*H01S 3/00* (2006.01)
*H04B 10/00* (2006.01)
(52) U.S. Cl. ...................... 359/333; 398/105
(58) Field of Classification Search ............... 359/333; 398/105; 385/101
See application file for complete search history.

(56) References Cited

U.S. PATENT DOCUMENTS 4,757,157 A * 7/1988 Pelet ........................... 174/50
6,496,626 B1 * 12/2002 Spagnoletti et al. ........ 385/101

* cited by examiner

*Primary Examiner*—Mark Hellner
(74) *Attorney, Agent, or Firm*—Meyer & Williams PC; Stuart H. Mayer, Esq.

(57) ABSTRACT

An undersea optical repeater is provided that includes a pressure vessel for use in an undersea environment. The pressure vessel has at least two cable-receiving elements for respectively receiving ends of optical cables that each includes an electrical conductor therein. At least one optical amplifier is located in the pressure vessel. The optical amplifier includes at least one electrical component adapted to receive electrical power from the electrical conductors in the optical cables. A dielectric envelope surrounds the pressure vessel to provide a hermetic seal therewith. The envelope includes a dielectric overmold surrounding at least a portion of the pressure vessel.

15 Claims, 7 Drawing Sheets

OVERMOLDED, ULTRA-SMALL FORM FACTOR OPTICAL REPEATER

RELATED APPLICATIONS

This application is related to application Ser. No. 10/687,547 filed Oct. 16, 2003 and entitled "Optical Amplifier Module Housed in a Universal Cable Joint For An Undersea Optical Transmission System", and application Ser. No. 10/800,424, filed Mar. 12, 2004, and entitled "Thermal Management of an Optical Amplifier Module Housed In A Universal Cable Joint".

FIELD OF THE INVENTION

The present invention relates to the field of optical repeaters, and more particularly to an optical repeater employed in an undersea optical transmission system.

BACKGROUND OF THE INVENTION

Undersea optical communication systems include land-based terminals containing transmitters and receivers connected by a cabled-fiber-transmission medium that includes periodically spaced repeaters, which contain optical amplifiers whose purpose is to compensate for the optical attenuation in the cabled fiber. In a bidirectional transmission system each repeater will generally contain two or more optical amplifiers, one for each of the oppositely-directed transmission paths. As the repeaters are usually placed undersea and away from power sources, power must be supplied remotely to the repeaters. The cabled fiber therefore usually contains a copper conductor to carry electrical power to the repeaters from the terminals. These undersea systems serve to carry optical communication signals (i.e., traffic) between the terminals. The traffic on these systems can consist of voice, data, television, Internet traffic, international telephone traffic, etc. Consequently, the revenue lost when the system is down can be significant. Therefore, these systems must have high reliability and availability.

Repeaters are typically housed in a pressure vessel that must withstand high undersea hydrostatic pressures and remain hermetic for at least 25 years. The pressure vessel must also be corrosion resistant or at least capable of being coated with an anticorrosion component. Suitable materials that are often employed include a high-strength grade of copper-beryllium and steel. The pressure vessel is generally quite large, often over 1000 cm in length, with a pressure vessel designed to house sixteen optical amplifiers for amplifying eight fiber pairs often being around 1500 cm in length.

To provide a hermetic seal and to prevent corrosion, particularly if steel is employed, fusion-bonded epoxy and polypropylene and polyurethane paint are coated directly onto the pressure vessel.

SUMMARY OF THE INVENTION

In accordance with the present invention, an undersea optical repeater is provided that includes a pressure vessel for use in an undersea environment. The pressure vessel has at least two cable-receiving elements for respectively receiving ends of optical cables that each includes an electrical conductor therein. At least one optical amplifier is located in the pressure vessel. The optical amplifier includes at least one electrical component adapted to receive electrical power from the electrical conductors in the optical cables. A dielectric envelope surrounds the pressure vessel to provide a hermetic seal therewith. The envelope includes a dielectric overmold surrounding at least a portion of the pressure vessel.

In accordance with one aspect of the invention, the dielectric overmold surrounds the entire pressure vessel.

In accordance with another aspect of the invention, the pressure vessel includes a cylindrical portion and end caps coupled to opposing ends of the cylindrical portion.

In accordance with another aspect of the invention, the dielectric overmold surrounds at least the end caps of the pressure vessel.

In accordance with another aspect of the invention, the dielectric envelope includes a preformed dielectric sheath press-fitted around the cylindrical portion of the pressure vessel.

In accordance with another aspect of the invention, the dielectric overmold is a thermoplastic material.

In accordance with another aspect of the invention, the thermoplastic material is polyethylene.

In accordance with another aspect of the invention, the preformed dielectric sheath is a polyethylene sheath.

In accordance with another aspect of the invention, the pressure vessel is a pressure vessel adapted for an undersea optical fiber cable joint.

In accordance with another aspect of the invention, the pressure vessel is a pressure vessel adapted for a universal cable joint for jointing optical cables having different configurations.

In accordance with another aspect of the invention, at least a portion of the pressure vessel is adapted to be in electrical contact with the electrical conductors in the optical cables.

In accordance with another aspect of the invention, the end caps are each adapted to be in electrical contact with one of the electrical conductors in the optical cables.

DETAILED DESCRIPTION

Recently, ultra-small form factor optical repeaters for undersea use have been developed which have dimensions that are substantially smaller than that of conventional undersea optical repeaters. One example of such a repeater is disclosed in co-pending U.S. application Ser. Nos. 10/687,547 and 10/800,424, which are hereby incorporated by reference in their entirety. One example of the repeater shown in these references has dimensions of only about 7.5 cm×15 cm.

Figure 1:
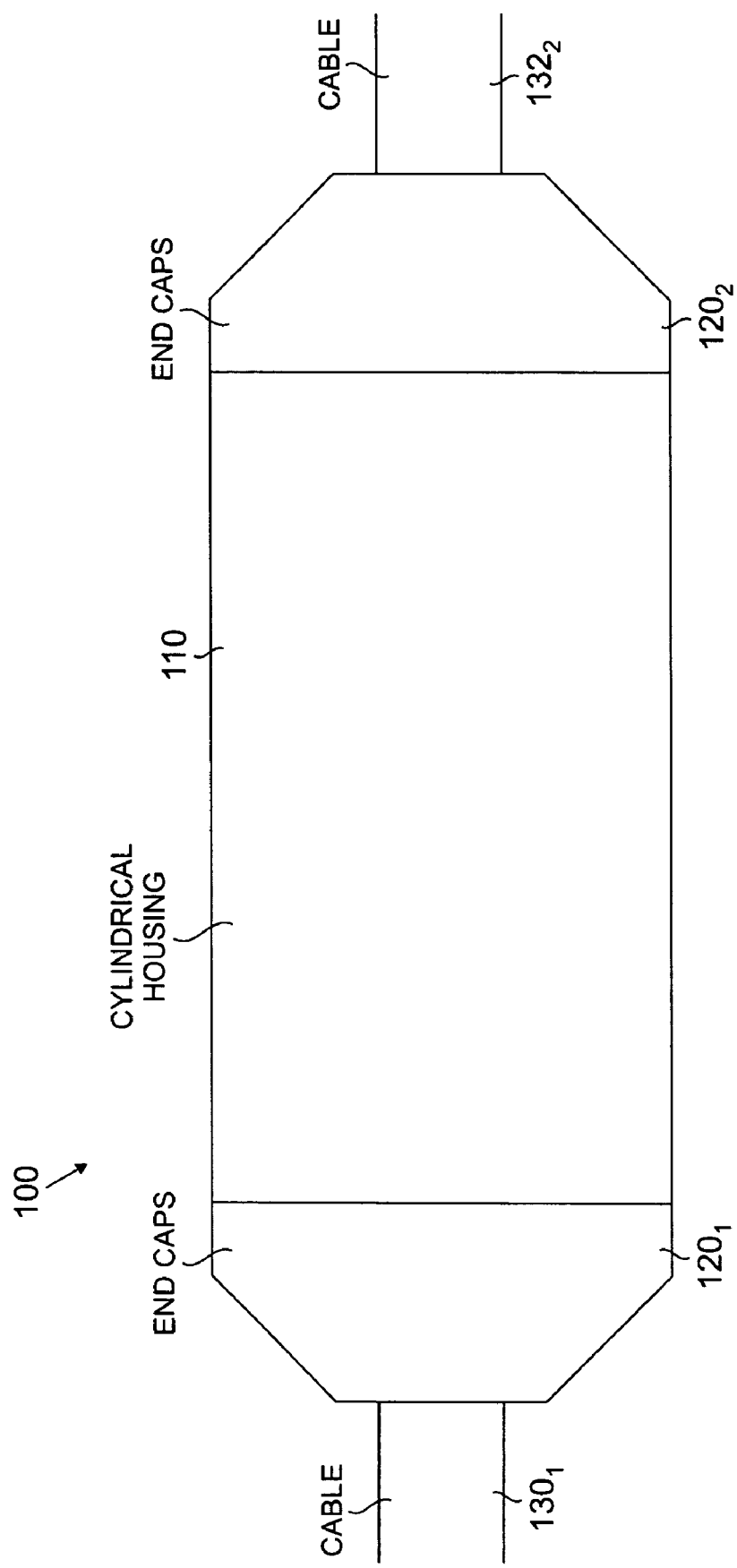
FIG. 1 shows a side view of a pressure vessel for an undersea optical repeater.

FIG. 1 shows a side view of one example of a repeater in which the present invention may be employed. The repeater 100 includes a pressure vessel comprising a cylindrical metallic housing 110 and metallic end caps $120_1$ and $120_2$ that are secured to opposing ends of the cylindrical housing 110. Optical cables $130_1$ and $130_2$ enter the repeater 100 through the end caps $120_1$ and $120_1$, respectively. End caps $120_1$ and $120_2$ are coupled via intermediate coupling means (not shown), for example, using a threaded connection, so that mechanical loads may be transferred from cable $130_1$ to cable $130_2$, and vice versa, such that mechanical continuity is provided to the larger communication cable formed by the joining of the cable segments. End caps $130_1$ and $130_2$, in this illustrative example, are shaped as a frustum. However, it is emphasized that the selection of this particular shape for end caps $130_1$ and $130_2$ is merely illustrative, as the invention is intended to encompass other shapes as well. The large end of the cone abuts the end of cylindrical housing 110 and the smaller end of the cone includes an opening to permit passage of the cables $130_1$ and $130_2$ into the interior space of repeater 100. In some designs, the end caps $120_1$ and $120_2$ may be fastened to the housing 110, using, for example, conventional fastening means, such that the housing 110 also is a load-bearing member of the repeater.

Housing 110 is utilized to create an interior space in repeater 110 which contains the various electrical and optical components of the repeater such as erbium doped fiber, pump sources, couplers and the like. It is noted that the interior space of housing 110 and the contents therein, are not particularly pertinent to the invention at hand, and therefore, except in one example presented below for illustrative purposes, no further details regarding such space and contents are provided herein.

Because of their reduced dimensions and the commensurate limitations imposed on the arrangement of the optical and electrical components housed in the repeater 100, in some cases all or part of the pressure vessel is electrically active. That is, there is a voltage on all or part of the pressure vessel. This voltage arises because the electrical power conductors located in cables $130_1$ and $130_2$ are in electrical contact with all or part of the pressure vessel. As is well known to those of ordinary skill in the art, the electrical power conductors supply electrical power to the electrical components housed in the repeater 100.

Because all or part of the pressure vessel is electrically active, it is necessary to provide a dielectric material on the pressure vessel to isolate it to prevent an electrical short to seawater, which typically serves as a ground. Such a dielectric is not required in a conventional repeater that is substantially larger in size than in the present invention because its pressure vessel is generally not electrically active since there is sufficient dielectric material located in its interior to electrically isolate the pressure vessel.

Figure 2:
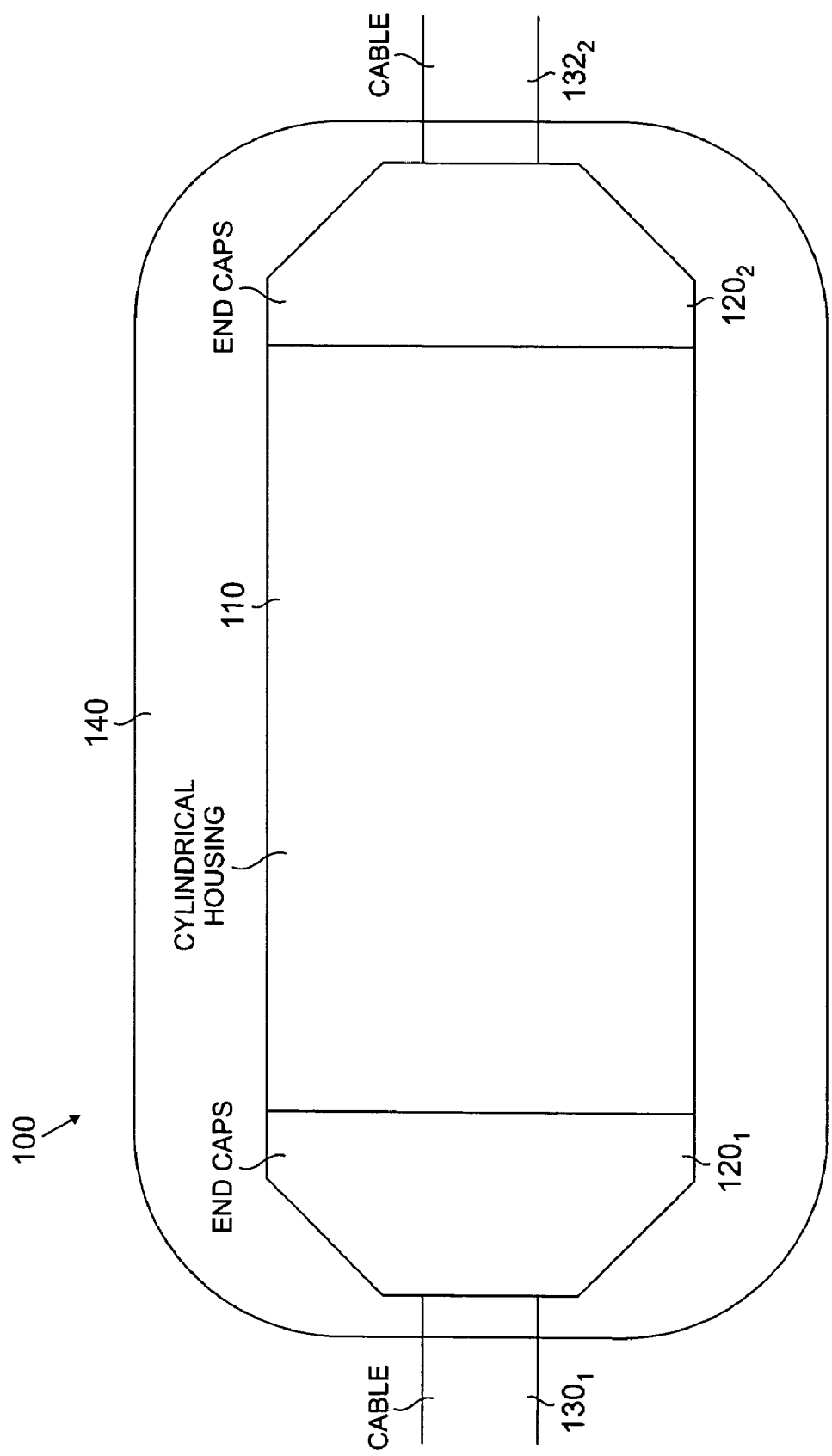
FIG. 2 shows a side view of a pressure vessel surrounded by an overmolded envelope constructed in accordance with the present invention.

In accordance with the present invention, a dielectric material is applied to the outer surface of the repeater pressure vessel. The dielectric material has a sufficient resistivity to electrically isolate the pressure vessel from the surrounding seawater. In particular, in some embodiments of the invention the resistivity should be sufficient to isolate up to about 100 amps of current at a voltage of about 2–6 kilovolts. In some embodiments of the invention the high voltage dielectric material is a polymer material such as polyethylene that is molded directly around the pressure vessel in an overmolding process. The molding process that is employed will depend on the particular dielectric material that is to be applied. For example, if a thermoplastic material such as polyethylene is employed, an injection molding process may be advantageously used. Of course, any other appropriate molding process may be employed such as compression molding and transfer molding, for example. FIG. 2 shows the high voltage dielectric overmold 140 surrounding the repeater 100 depicted in FIG. 1.

One problem with the use of an overmolding technique that is applied to a repeater is that the molding process requires elevated temperatures with the molten material contacting the pressure vessel. The heat from the mold and the molten material will cause an increase in the temperature of the optical and electrical components located within the repeater. While these components may be able to withstand limited increases in temperature over a short period of time, it would in some cases be preferable to minimize the amount of heat that is conducted to them to prevent their temperatures from rises excessively. This problem is exacerbated because, as previously mentioned, the overmolding process is applied to ultra-small form-factor repeaters, which can readily conduct heat, particularly since the repeaters are generally designed to efficiently dissipate thermal energy that is generated by internal components such as pump sources and zener diodes.

To alleviate the problem caused by excessive heat, in some embodiments of the invention only a portion of the pressure vessel is overmolded. The overmolded portion will reside relatively far from the location of the internal components. For example, in the repeater depicted in FIG. 1, the temperature-sensitive components are located within the cylindrical housing. If in this case only the end caps $120_1$ and $120_2$ are overmolded and not the cylindrical housing 110, the heat conducted from the end caps through the cylindrical housing and transferred to the internal components can be reduced. To electrically isolate the cylindrical housing 110, a dielectric sheath may be press-fitted around it prior to overmolding the end caps $120_1$ and $120_2$.

Figure 3:
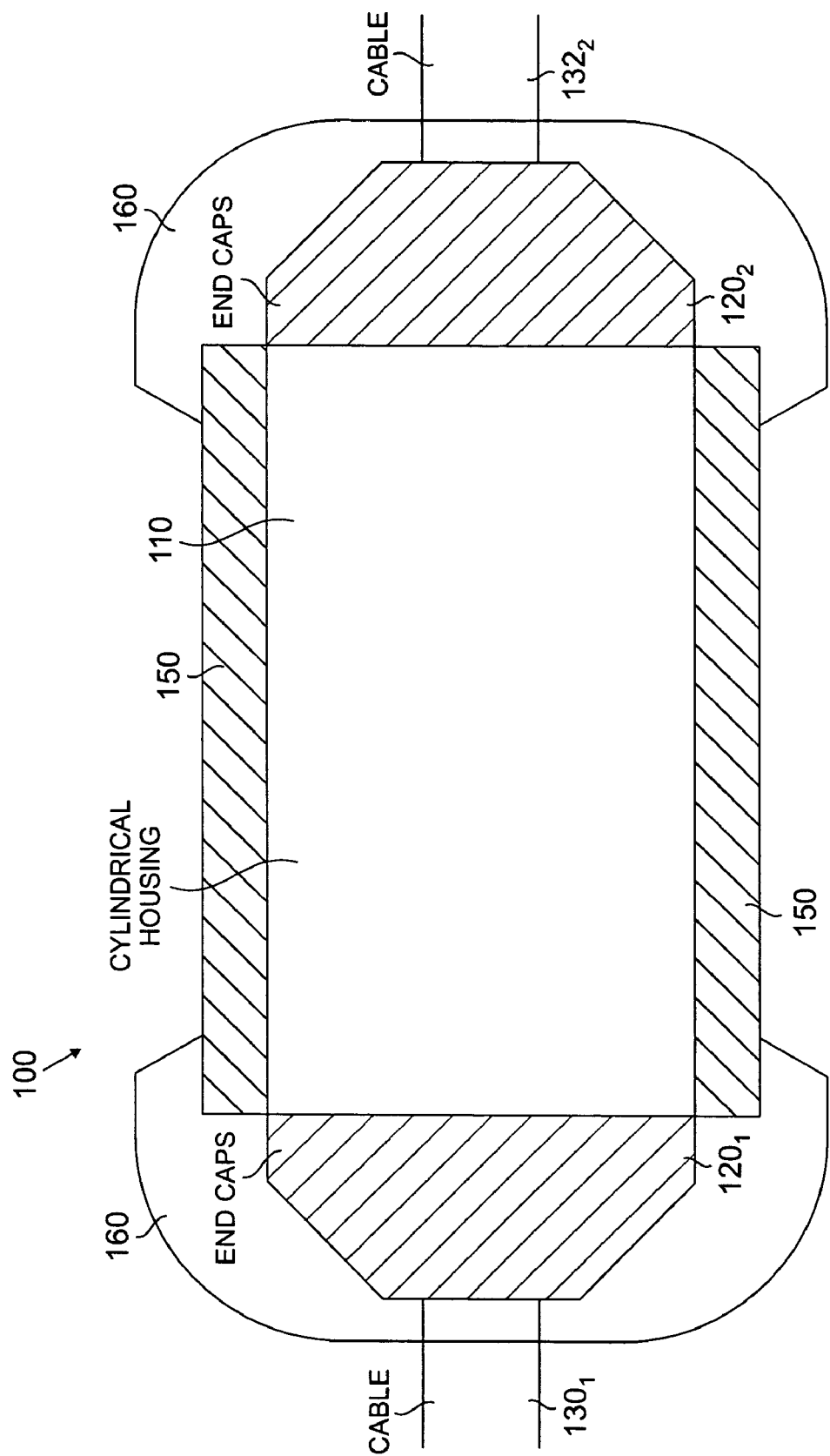
FIG. 3 shows a side view of a pressure vessel surrounded in part by a press-fitted sheath and in part by an overmold constructed in accordance with the present invention.

FIG. 3 shows an embodiment of the invention in which a press-fitted sheath 150 surrounds the cylindrical housing 110 and an overmolded material 160 is applied to the end caps $130_1$ and $130_2$. The overmolded material 160 may overlap the press-fitted sheath 150 to form a continuous protective layer that provides both a hermetic seal and the requisite electrical insulation over the entire repeater 100. If the overmolding material that is selected is polyethylene, the press-fitted sheath 140 may advantageously also be formed from polyethylene. Of course, the present invention encompasses other materials as well, provided they have sufficient dielectric and corrosion-resistant properties.

In one embodiment of the invention the internal electrical and optical components of the repeaters are located in an optical amplifier module 400 of the type depicted in FIGS. 4–7 and which is disclosed in the aforementioned copending U.S. application Ser. Nos. 10/687,547 and 10/800,424. Optical amplifier module 400 is designed to fit within a pressure vessel that typically serves as a universal cable joint for jointing fiber optical cables for use in undersea optical telecommunications systems. The optical amplifier module 400 depicted in the figures can support 4 erbium-doped fiber amplifiers (EDFAs), physically grouped as a dual amplifier unit for each of two fiber pairs. Of course, the present invention encompasses optical amplifier modules that can support any number EDFAs.

Each optical amplifier includes an erbium doped fiber, an optical pump source, an isolator and a gain flattening filter (GFF). The amplifiers are single-stage, forward pumped with cross-coupled pump lasers. A 3 dB coupler allows both coils of erbium doped fiber in the dual amplifier to be pumped if one of the two pump lasers fails. At the output, an isolator protects against backward-scattered light entering the amplifier. The gain flattening filter is designed to flatten the amplifier gain at the designed input power. An additional optical path may be provided to allow a filtered portion of the backscattered light in either fiber to be coupled back into the opposite direction, allowing for COTDR-type line-monitoring. Of course, optical amplifier module 400 may support EDFAs having different configurations such as multistage amplifiers, forward and counter-pumped amplifiers, as well as fiber amplifiers that employ rare-earth elements other than erbium.

Figure 4:
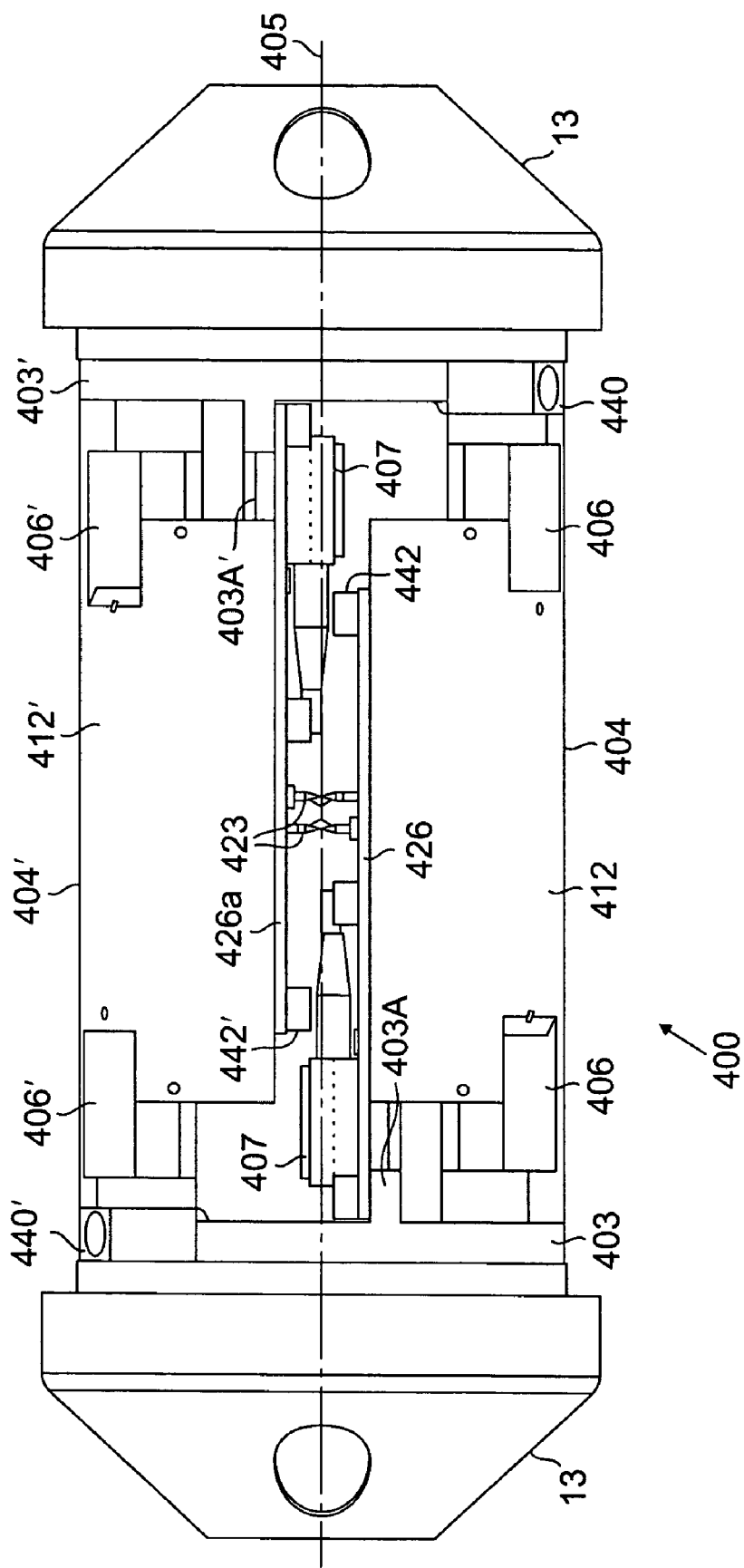
FIG. 4 shows a side view of an optical amplifier module that may be employed in a repeater constructed in accordance with the present invention.
Figure 5:
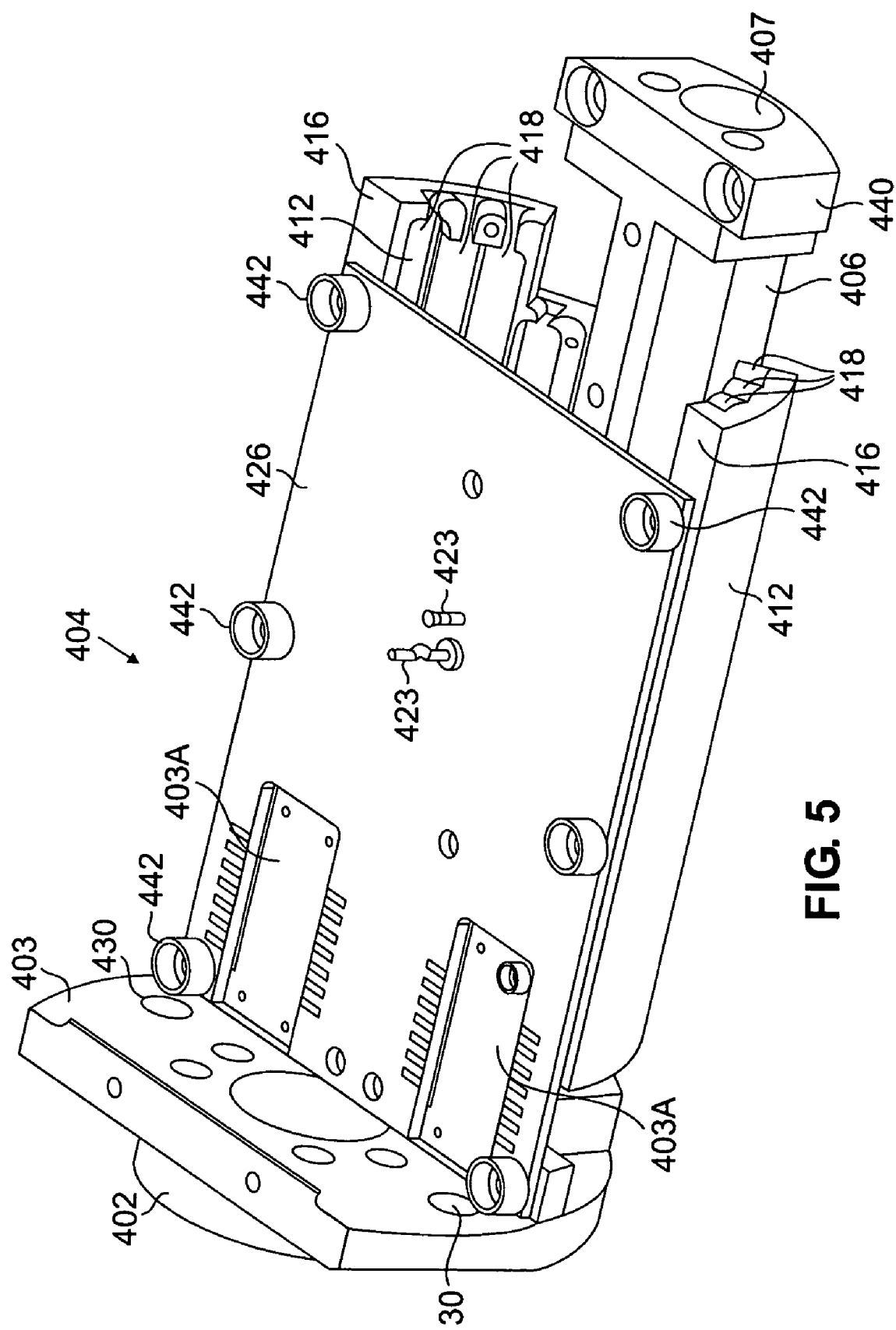
FIG. 5 shows a perspective view of one of the half units that form the optical amplifier module depicted in FIG. 4.

A side view of optical amplifier module 400 is shown in FIG. 4 with the end caps 13 (corresponding to end caps 120 in FIG. 1) in place but without the cylindrical housing 100. The module 400 is defined by a generally cylindrical structure having flanges 402 (seen in FIG. 5) located on opposing end faces 403. A longitudinal plane 405 extends through the optical amplifier module 400 to thereby bisect the module 400 into two half units 404 and 404' that are symmetric about a rotational axis perpendicular to the longitudinal plane 405. That is, as best seen in FIG. 5, rather than dividing the end faces 403 into two portions located on different half units 404, each half unit 404 includes the portion of one of the end faces 403 on which a respective flange 402 is located. FIG. 5 shows a perspective view of one of the units 404. In the embodiment of the invention depicted in FIGS. 4–9, each half unit 404 houses two erbium-doped fiber amplifiers Flanges 402 mate with cable termination units (not shown) of the aforementioned universal joint. As seen in the cross-sectional views of FIGS. 7 and 8, through-holes 407 extend inward from the end faces 403 through which the tension rod of the universal joint are inserted. The end faces 403 also include clearance holes 430 for securing the end caps to the optical amplifier module 400. The clearance holes 430 are situated along a line perpendicular to the line connecting the tension rods thru-holes 407.

Figure 6:
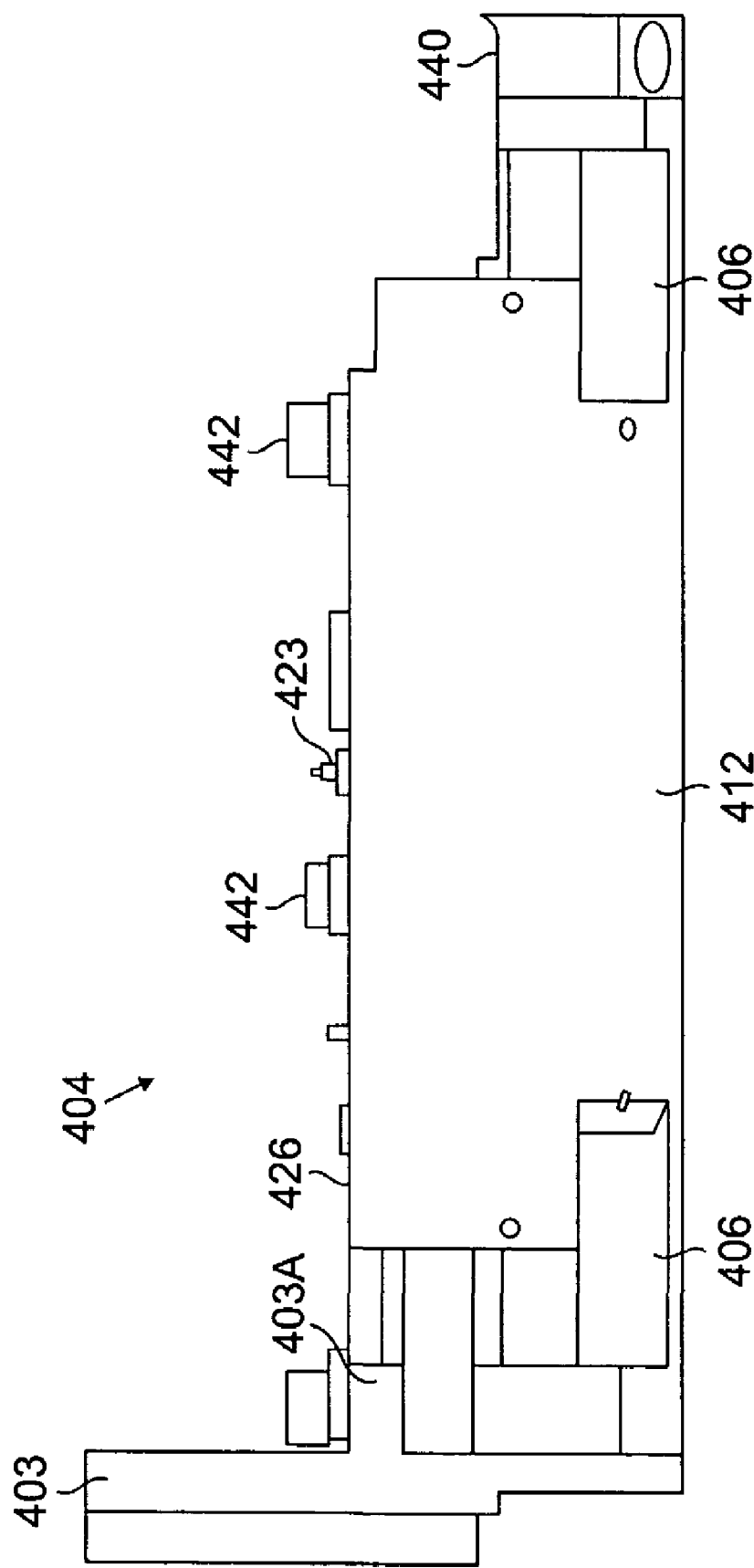
FIG. 6 shows a side view of one of the half units that form the optical amplifier module depicted in FIG. 4.
Figure 7:
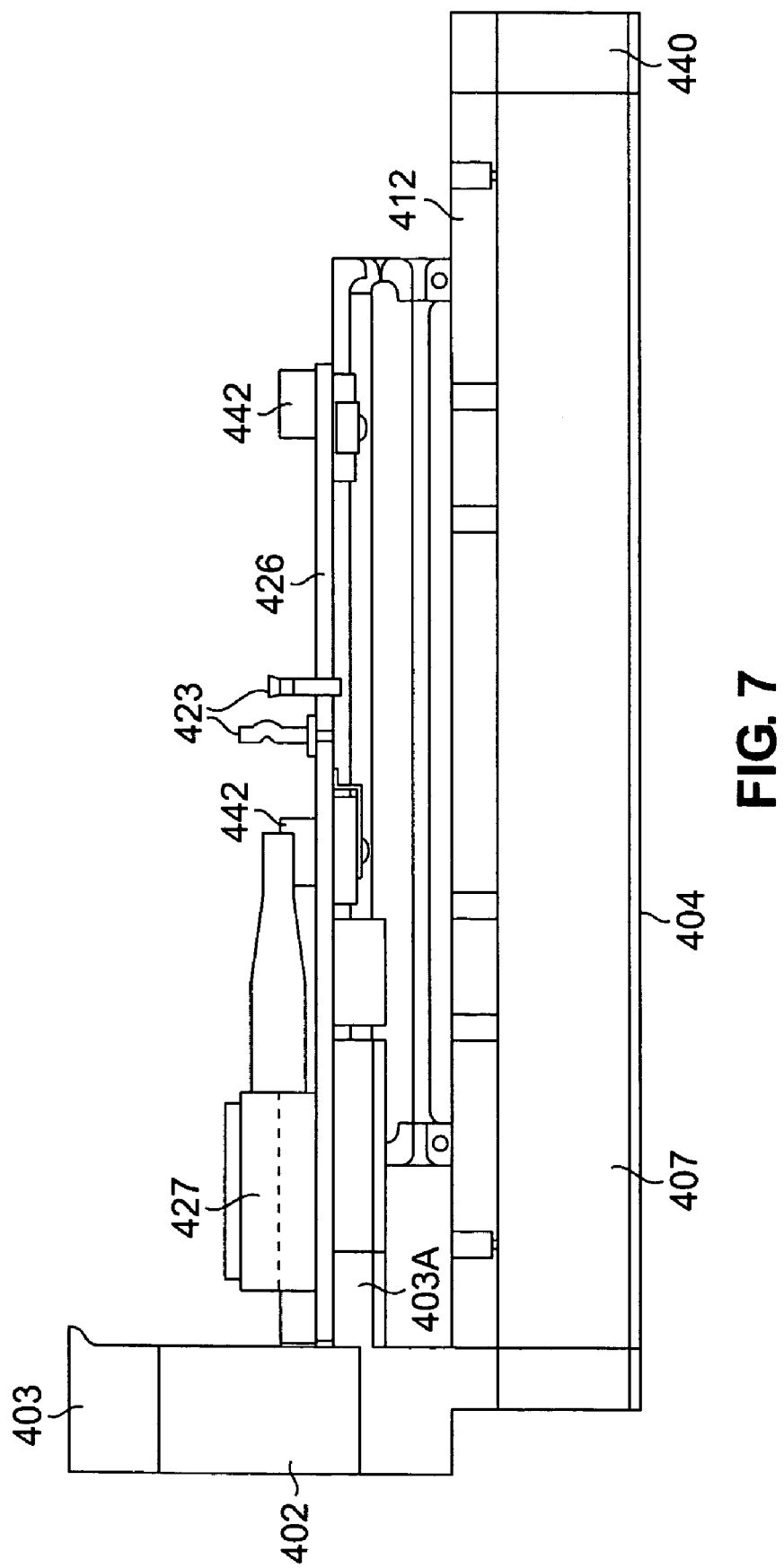
FIG. 7 shows a cross-sectional side view one of the half units that form the optical amplifier module depicted in FIG. 4.

As shown in FIGS. 4–6, each unit 404 includes curved sidewalls 412 forming a half cylinder that defines a portion of the cylindrical structure. A spinal member 406 is integral with and tangent to the curved sidewalls 412 and extends longitudinally therefrom. The thru hole 407 containing the tension rod of the universal joint extends through the spinal member 406. A ceramic boss 440 is located on the end of the spinal member 406 remote from the end flange 403. As shown in FIGS. 5 and 7, the thru hole 407 extends through the ceramic boss 440. As discussed below, the ceramic boss 440 prevents the flow of current from one half unit 404 to the other.

A circuit board support surface 416 extends along the periphery of the unit 404 in the longitudinal plane 405. Circuit board 426 is mounted on support surface 416. When the half units 404 and 404' are assembled, circuit boards 426 and 426' are interconnected by a pair of interlocking conductive power pins 423 that provide electrical connectivity between the two circuit boards 426 and 426'. The inner cavity of the unit 404 located between the circuit board support surface 416 and the spinal member 406 serves as an optical fiber storage area. Optical fiber spools 420 are located on the inner surface of the spinal member 406 in the optical fiber storage area. The erbium doped fibers, as well as any excess fiber, are spooled around the optical fiber spools 420. The optical fiber spools 420 have outer diameters that are at least great enough to prevent the fibers from bending beyond their minimum specified bending radius.

The curved sidewalls 412 are sufficiently thick to support a plurality of thru-holes 418 that extend therethrough in the longitudinal direction. The thru-holes 418 serve as receptacles for the passive components of the optical amplifiers. That is, each receptacle 418 can contain a component such as an isolator, gain flattening filter, coupler and the like.

End faces 403 each include a pair of pump support bosses 403a (see FIGS. 6 and 7) that extend inward and parallel to the circuit board 426. The circuit board 426 has cut-outs so that the pump support bosses 403a are exposed. A pump source 427 that provides the pump energy for each optical amplifier is mounted on each pump boss 403a.

The invention claimed is:

1. An undersea optical repeater, comprising:
a pressure vessel for use in an undersea environment, said pressure vessel having at least two cable receiving elements for respectively receiving ends of optical cables that each include an electrical conductor therein;
at least one optical amplifier located in the pressure vessel, said optical amplifier including at least one electrical component adapted to receive electrical power from the electrical conductors in the optical cables; and
a dielectric envelope surrounding the pressure vessel to provide a hermetic seal therewith, said envelope including a preformed dielectric sheath press-fitted around a central portion of the pressure vessel and a dielectric overmold surrounding at least end portions of the pressure vessel.

2. The undersea optical repeater of claim 1 wherein said central portion of the pressure vessel houses the optical amplifier.

3. The undersea optical repeater of claim 1 wherein the first portion of the pressure vessel includes a cylindrical portion and the end portions include end caps coupled to opposing ends of the cylindrical portion.

4. The undersea optical repeater of claim 2 wherein the first portion of the pressure vessel includes a cylindrical portion and the end portions include end caps coupled to opposing ends of the cylindrical portion.

5. The undersea optical repeater of claim 1 wherein said dielectric overmold is a thermoplastic material.

6. The undersea optical repeater of claim 4 wherein said dielectric overmold is a thermoplastic material.

7. The undersea optical repeater of claim 5 wherein said thermoplastic material is polyethylene.

8. The undersea optical repeater of claim 6 wherein said thermoplastic material is polyethylene.

9. The undersea optical repeater of claim 7 wherein said preformed dielectric sheath is a polyethylene sheath.

10. The undersea optical repeater of claim 1 wherein said pressure vessel is a pressure vessel adapted for an undersea optical fiber cable joint.

11. The undersea optical repeater of claim 1 wherein said pressure vessel is a pressure vessel adapted for a universal cable joint for jointing optical cables having different configurations.

12. The undersea optical repeater of claim 1 wherein at least a portion of the pressure vessel is adapted to be in electrical contact with the electrical conductors in the optical cables.

13. The undersea optical cable of claim 3 wherein said end caps are each adapted to be in electrical contact with one of the electrical conductors in the optical cables.

14. An undersea optical repeater, comprising:

a pressure vessel for use in an undersea environment, said pressure vessel having at least two cable receiving elements for respectively receiving ends of optical cables that each include an electrical conductor therein, said pressure vessel further including a portion intermediate to the cable receiving elements in which at least a portion of optical or electrical components associated with an optical amplifier are located, said optical amplifier including at least one electrical component adapted to receive electrical power from the electrical conductors in the optical cables; and a dielectric envelope surrounding the pressure vessel to provide a hermetic seal therewith, said dielectric envelope including a dielectric overmold surrounding the cable receiving elements but not the portion intermediate to the cable receiving elements.

15. The undersea optical repeater of claim 14 wherein the dielectric envelope further comprises a preformed dielectric sheath press-fitted around the portion intermediate to the cable receiving elements.

* * * * *